United States Patent
Doshi et al.

(10) Patent No.: US 6,219,339 B1
(45) Date of Patent: Apr. 17, 2001

(54) METHOD AND APPARATUS FOR SELECTIVELY DISCARDING PACKETS

(75) Inventors: Bharat Tarachand Doshi, Holmdel; Kotikalapudi Sriram; Yung-Terng Wang, both of Marlboro, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/026,830

(22) Filed: Feb. 20, 1998

(51) Int. Cl.⁷ .................................................. H04L 12/28
(52) U.S. Cl. ........................ 370/235; 370/395; 370/389
(58) Field of Search .................................... 370/235, 230, 370/395, 394, 355, 412, 429, 473, 474, 389, 393, 397, 414, 418, 428, 471, 479

(56) References Cited

U.S. PATENT DOCUMENTS

| | | | |
|---|---|---|---|
| 5,553,061 | * 9/1996 | Waggener, Jr. et al. | 250/491.1 |
| 5,555,264 | * 9/1996 | Sallberg et al. | 370/414 |
| 5,740,173 | * 4/1998 | Fiorini | 370/394 |
| 5,813,042 | * 9/1998 | Campbell et al. | 711/159 |
| 5,838,677 | * 11/1998 | Kozaki et al. | 370/389 |
| 6,049,527 | * 4/2000 | Isoyama et al. | 370/235 |
| 6,067,298 | * 5/2000 | Shinohara | 370/395 |
| 6,091,709 | * 7/2000 | Harrison et al. | 370/235 |
| 6,094,435 | * 7/2000 | Hoffman et al. | 370/414 |
| 6,122,252 | * 9/2000 | Aimoto et al. | 370/235 |
| 6,122,253 | * 9/2000 | Jones | 370/235 |

OTHER PUBLICATIONS

John G. Gruber and Nguyen H. Le, "Performance Requireiments for Integrated Voice/Data Networks", IEEE Journal on Selected Areas in Communications, vol. SAC–I, No. 6, Dec. 1983.

Nuggehally S. Jayant and Susan W. Christensen, "Effects of Packet Losses in Waveform Coded Speech and Improvements Due to an Odd–Even Sample–Interpolation Procedure", IEEE Transactions on Communicatinos, vol. COM–29, No. 2, Feb. 1981.

David W. Petr, Luiz A. DaSilva, Jr., and Victor S. Frost, "Priority Discarding of Speech in Integrated Packet Networks", IEEE Journal on Selected Areas in Communications, vol. 7, No. 5, Jun. 1989.

Kotikalapudi Sriram, R. Scott McKinney, and Mostafa Hashem Sherif, "Voice Packetization and Compression in Broadband ATM Networks", IEEE Journal on Selected Areas in Communications, vol., 9, No. 3, Apr. 1991.

Nanying Yin, San–Qi Li, Thomas E. Stern, "Congestion Control for Packet Voice by Selective Packet Discarding", IEEE Transactions on Communications, vol. 38, No. 5, May 1990.

* cited by examiner

*Primary Examiner*—Wellington Chin
*Assistant Examiner*—Brenda H. Pham
(74) *Attorney, Agent, or Firm*—Joseph J. Opalach

(57) ABSTRACT

In a packet voice system, discarding of a packet is performed as a function of previously discarded packets. In one embodiment, a packet voice system includes an ATM Adaptation Layer Type 2 (AAL2) and Service Specific Convergence Sublayer (SSCS) System. In this system, a transmission buffer stores AAL2 voice packets for transmission, each AAL2 voice packet comprising a sequence number, the values of which range from 0 to n−1, and a source identifier, k. When traffic congestion is detected, the transmitter portion of the SSCS System selectively discards one packet from a source k at the output of the transmission buffer if no packet from source k was dropped in either the last n−1 packets or over a predefined prior interval of time. Another embodiment of the invention discards packets at the input of the transmission buffer.

43 Claims, 10 Drawing Sheets

700

| CID<br>8 BITS | LI<br>6 BITS | RES<br>5 BITS | HEC<br>5 BITS |
|---|---|---|---|

PACKET HEADER (3 OCTETS)

◄──────────── STF (OCTET) ────────────►

| OFFSET FIELD (OSF)<br>6 BIT | SEQUENCE NUMBER (SN)<br>1 BIT | PARITY (P)<br>1 BIT |
|---|---|---|

FIG. 10
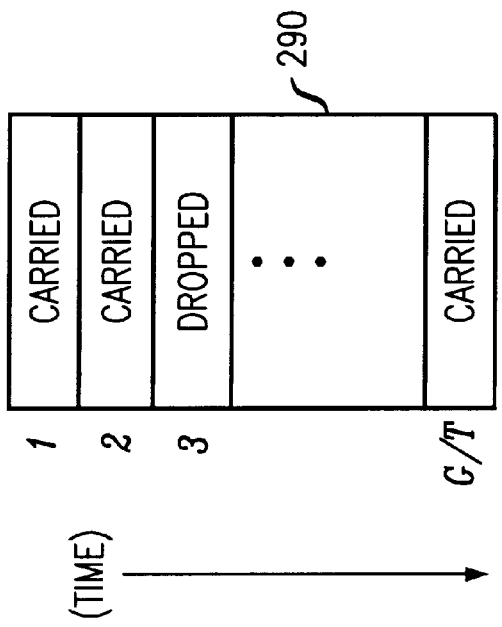
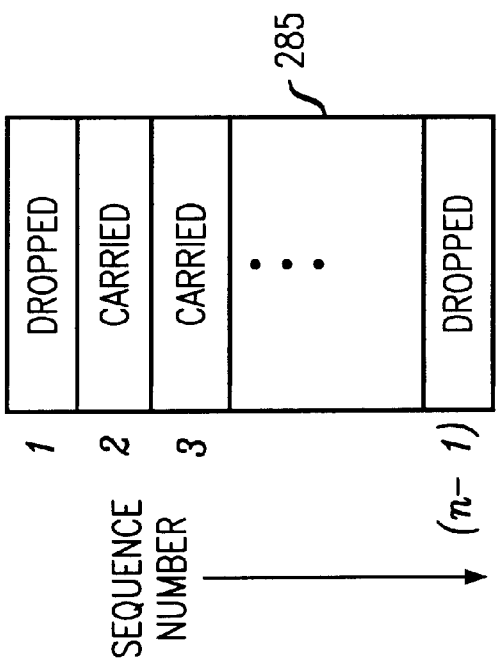

AAL2 VOICE MULTIPLEXER WITH SELECTIVE PACKET DISCARD AT INPUT OF QUEUE

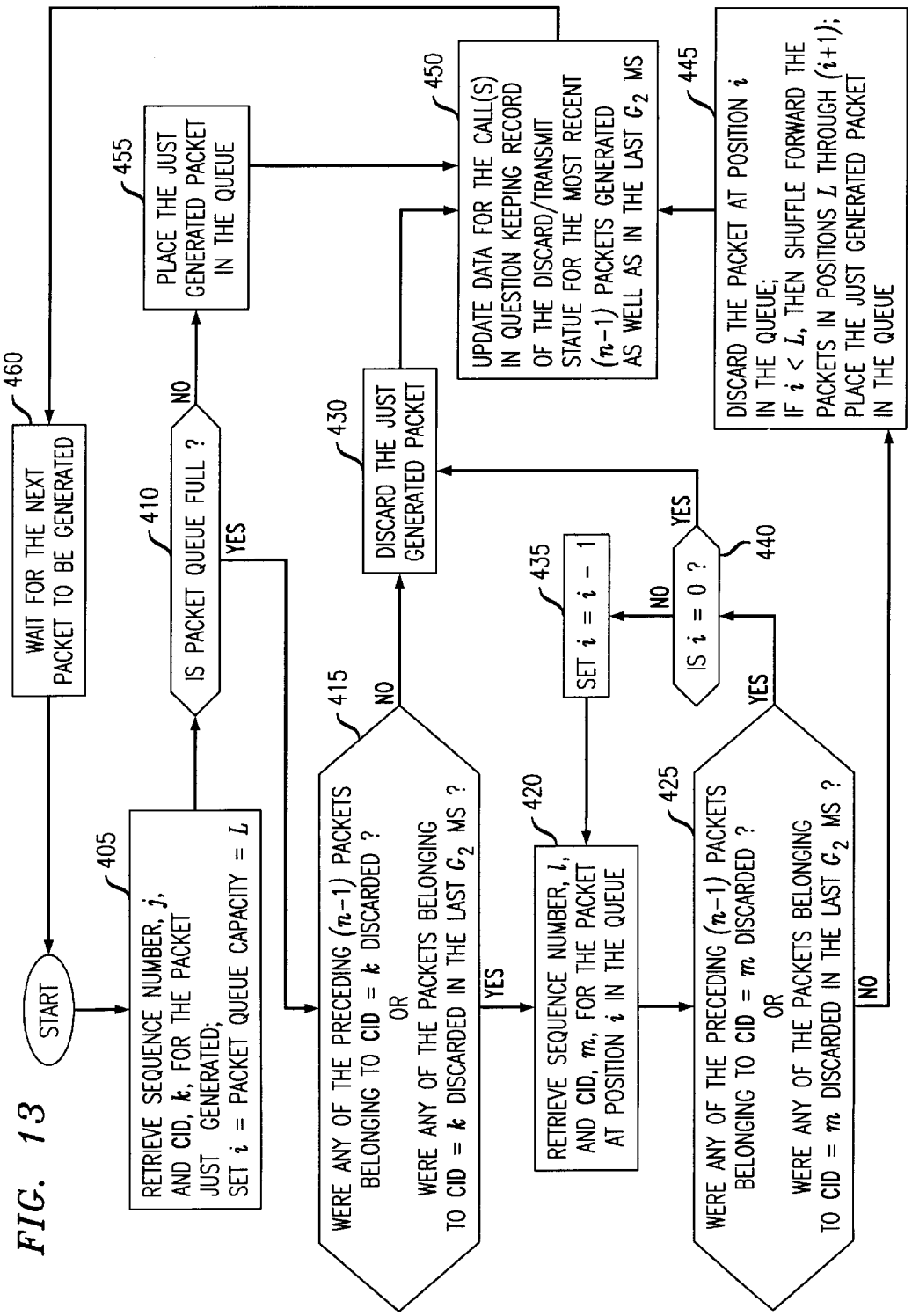

METHOD AND APPARATUS FOR SELECTIVELY DISCARDING PACKETS

FIELD OF THE INVENTION

This invention relates generally to communications and, more particularly, to packet voice systems.

BACKGROUND OF THE INVENTION

In packet voice systems, as in any packet-based system, periods of traffic congestion may result. This traffic congestion adds delay to the packet system and, as such, impacts the ability of people to effectively carry on a conversation. Congestion also results in packet losses due to buffer overflow, and creates degradation in quality of voice communication.

One approach to alleviating traffic congestion is to selectively drop entire voice packets. Generally, the selectively dropped voice packets represent "less-important" speech such as "semi-silence" (e.g., see Nanying Yin, San-Qi Li, and Thomas E. Stern, "Congestion Control for Packet Voice by Selective Packet Discarding," IEEE Trans. on Communications, May 1990, Vol. 38, No. 5; Kotikalapudi Sriram, R. Scott McKinney, and Mostafa Hashem Sherif, "Voice Packetization and Compression in Broadband ATM Networks," IEEE Journal on Selected Areas in Communications, Vol. 9, No. 3, April 1991; and David W. Petr, Luiz A DaSilva, Jr., Victor S. Frost, "Priority Discarding of Speech in Integrated Packet Networks," IEEE Journal on Selected Areas in Communications, Vol. 7, No. 5, June 1989). (For completeness only, it should be noted that there are also other alternatives such as ITU (International Telecommunications Union) Embedded Adaptive Differential Pulse Code Modulation (ADPCM) Standard G.727, which describes a method for dropping the least significant bits of a voice sample within a packet.)

When entire voice packets are dropped, subjective voice quality is affected. For example, it is well known that subjective voice quality degradation is virtually imperceptible for a random packet loss rate of up to 1 in 100 for wavefrom encoded speech such as pulse code modulation (CM) and ADPCM (e.g., see J. G. Gruber and N. Le, "Performance requirements for integrated voice/data networks," IEEE Journal on Selected Areas in Communications, December 1983, pp. 981–1005; and N. S. Jayant and S. W. Christensen, "Effects of packet losses in waveform coded speech and improvements due to an odd-even sample interpolation," IEEE Trans. on Communications, February 1981, pp. 101–109).

Unfortunately, selective discarding of entire voice packets as a function of the type of speech, e.g., semi-silence, may cause consecutive packets from the same voice source to be discarded. This phenomenon is shown in FIG. 1, which illustrates the nature of the packet voice arrival process (from multiple sources). During periods of congestion, the packets from a few sources tend to arrive at periodic intervals at the tail ends of bursts of packets from all sources. This is shown in FIG. 1 by burst 1, burst 2, and burst 3, and circles 11, 12, and 13. Consequently, in these periods these few sources experience excessive loss of consecutive packets due to buffer overflow, while packets of other sources do not experience such excessive loss. The loss of consecutive packets further degrades subjective voice quality and may become noticeable to the receiving party. As such, to avoid the perceptive quality degradation due to consecutive packet loss, the packet system is often designed for a much lower packet loss rate (e.g., about 1 in 1000 (or less) in the case of ADPCM encoded speech) for the voice quality degradation due to consecutive packet losses to remain imperceptible to the listener. Such a low packet loss rate requirement, of course, results in operating the system at much lower engineered traffic load and hence higher cost of the packet system.

SUMMARY OF THE INVENTION

We have discovered an alternative approach to selectively discarding packets. In particular, when a transmission buffer reaches a predefined level, discarding of a packet is performed as a function of previously discarded packets.

The inventive concept is applicable to packet systems in general, e.g., Asynchronous Transfer Mode (ATM), Internet Protocol (IP), Frame Relay (ITU-T G.764 packet format) systems, etc. As such, one embodiment is a generic form of packet system. In this system, a transmission buffer stores voice packets for transmission, each voice packet comprising a sequence number, the values of which range from 0 to n−1, and a source identifier, k. When traffic congestion is detected, the transmitter portion of the system selectively discards one packet from a source k at the output of the transmission buffer if no packet from source k was dropped in either the last n−1 packets from source k or over a predefined prior interval of time.

In another embodiment of the invention, a packet voice system includes an AAL2 and Service Specific Convergence Sublayer (SSCS) System. In this system, a transmission buffer stores AAL2 voice packets for transmission, each AAL2 voice packet comprising a sequence number, the values of which range from 0 to n−1, and a source identifier, k. When traffic congestion is detected, the transmitter portion of the SSCS System selectively discards one packet from a source k at the output of the transmission buffer if no packet from source k was dropped in either the last n−1 packets from source k or over a predefined prior interval of time.

In another embodiment of the invention, a packet voice system includes an AAL2 and Service Specific Convergence Sublayer (SSCS) System. In this system, a transmission buffer stores AAL2 voice packets for transmission, each AAL2 voice packet comprising a sequence number, the values of which range from 0 to n−1, and a source identifier, k. When traffic congestion is detected, the transmitter portion of the SSCS System selectively discards one packet from a source k at the input of the transmission buffer if no packet from source k was dropped in either the last n−1 packets from source k or over a predefined prior interval of time.

BRIEF DESCRIPTION OF THE DRAWING

FIG. 10 illustrates two tables for use in the method shown in FIG. 9;

FIG. 13 shows another illustrative method in accordance with the principles of the invention.

DETAILED DESCRIPTION

Figure 1:
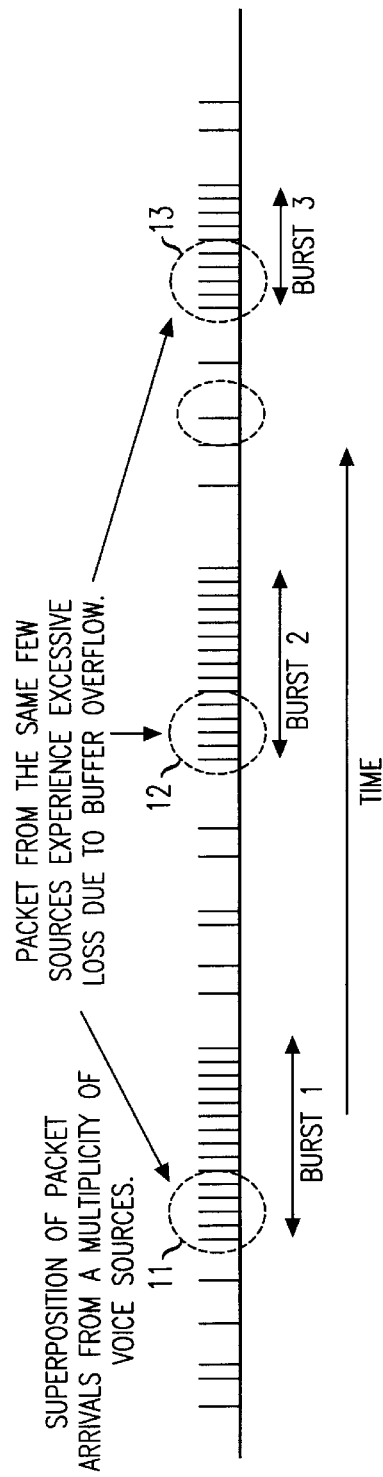
FIG. 1 is an illustration of a packet arrival model.
Figure 2:
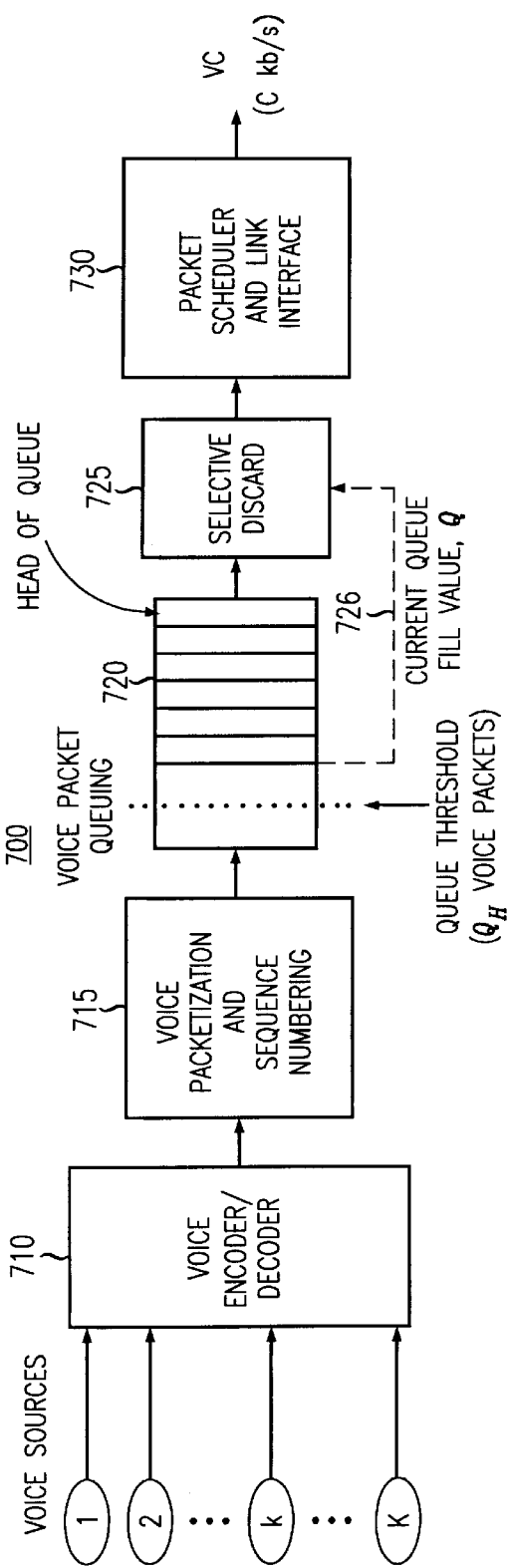
FIG. 2 shows an illustrative embodiment of a portion of a voice packet communications system in accordance with the principles of the invention.

The inventive concept is applicable to packet systems in general, e.g., Asynchronous Transfer Mode (ATM), Internet Protocol (IP), Frame Relay (ITU-T G.764 packet format) systems, etc. As such, one embodiment is a generic form of packet system as shown in FIG. 2. Packet system 700 includes a plurality of voice sources, k (1≦k≦K), voice encoder/decoder 710, voice packetization and sequence numbering element 715, queue 720, selective discard element 725, and packet scheduler and link interface 730. Other than the inventive concept, the elements shown in FIG. 2 are well-known and will not be described in detail. For example, although shown as a single block element, voice encoder/decoder 710 includes stored-program-control processors, memory, and appropriate interface cards. Each voice source provides a bit stream representing voice, or audio, information to voice encoder/decoder 710. The latter compresses the various bit streams into a compressed audio stream. Voice packetization and sequence numbering element 715 converts the compressed audio stream into voice packets for application to queue 720. This conversion performs silence suppression, assignment of sequence numbers; and background noise level notification. Queue 720 buffers voice packets for transmission. It is assumed that each voice packet has associated identification information. For example, the voice packet at the head of this queue has a sequence number j and belongs to a voice source k, described above. Packet scheduler and link interface 730 provides the interface to the virtual circuit (VC) and schedules voice packets for transmission.

Figure 11:
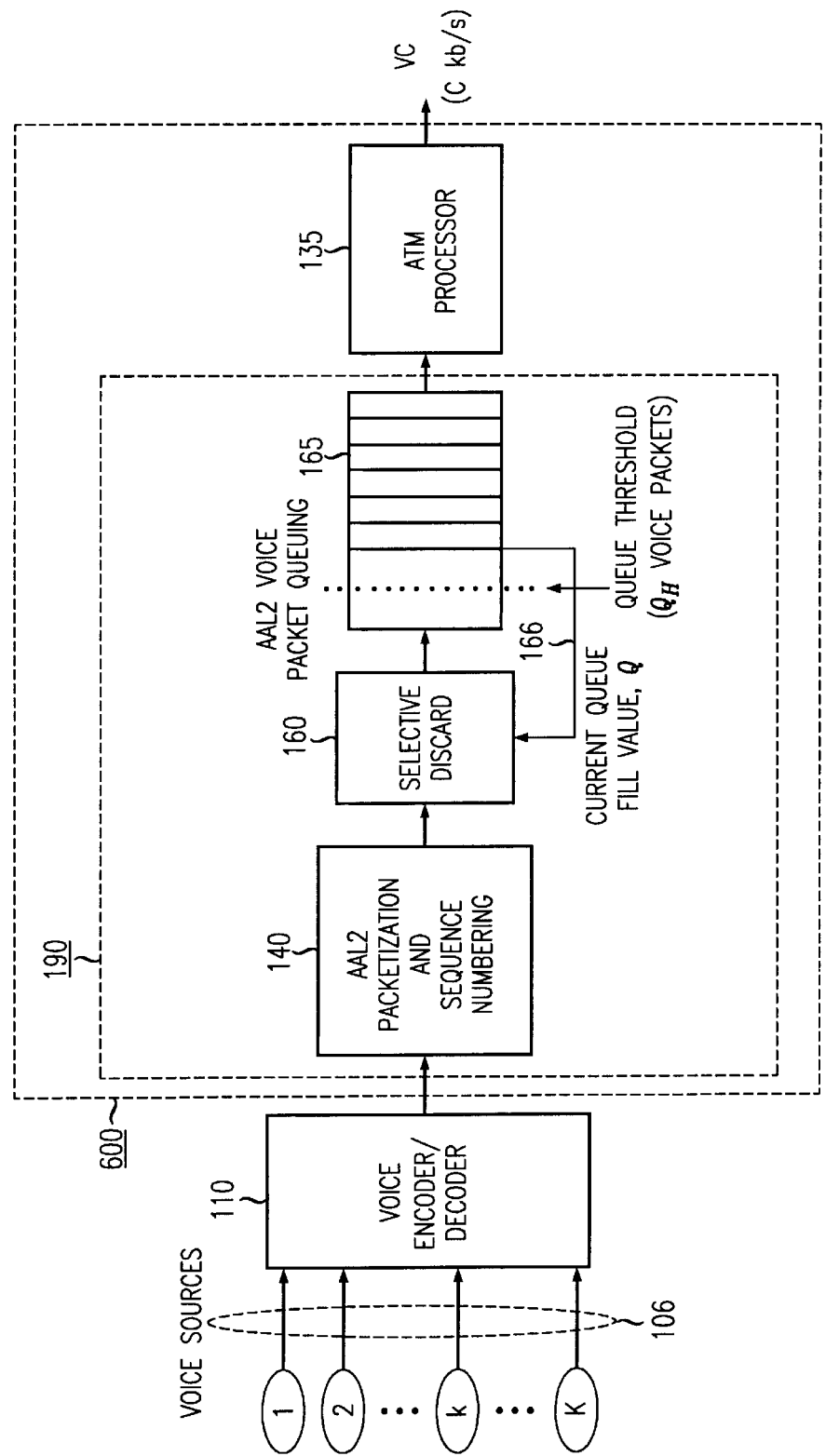
FIG. 11 shows another illustrative embodiment of a portion of a voice packet communications system in accordance with the principles of the invention.

In response to signaling (not shown) from packet scheduler and link interface 730, selective discard element 725 empties queue 720 and provides voice packets for transmission to packet scheduler and link interface 730. The rate at which packet scheduler and link interface 730 transmits voice packets directly effects the number of voice packets awaiting transmission in queue 720. As such, during periods of network congestion, the number of voice packets awaiting transmission in this queue increases. The number of voice packets in queue 720 at any time is referred to herein as the current queue fill value, Q. The current queue fill value is provided to selective discard element 725 via signal 726. When the current queue fill value exceeds a predefined queue threshold value, $Q_H$, selective discard element 725 selectively discards entire voice packets in accordance with the principles of the invention, by selectively discarding one packet from a group of N packets awaiting transmission. In particular, selective discard element 725 removes voice packets from the head of queue 720 in accordance with a "modulo-N selective discard" method (described below). (It should be noted that other alternative designs are possible, e.g., with selective discard element 725 placed between voice packetization and sequence numbering element 715 and queue 720. This is illustrated in the embodiment of FIG. 11 (described below).)

The selective discard of voice packets in accordance with the inventive concept spreads packet loss over multiple users during a traffic congestion, or overload condition. As a result, the inventive concept provides the ability to get more mileage out of sequence numbers by, e.g., preventing the forward/backward slips (described below) by keeping lost packets to approximately one in every N packets or less during periods of congestion. In this approach, it is much less likely that the same source will suffer consecutive packet discard.

At this point, having described a general embodiment of the inventive concept, some background information on ATM, ATM Adaptation Layers (AALs) (more particularly, AAL2), and AAL2 Voice Packet Communications is provided. After the background information, the inventive concept in the context of ATM is described in the section entitled "Selective Discard of Packets."

ATM and AAL2

ATM networks carry fixed size (53 octets) cells within the network irrespective of the applications being carried over ATM. To support applications in native protocol mode, a Terminal Adapter (TA) at the network edge acts as an 'ATM user' and implements an ATM Adaptation Layer (AAL) to map the services offered by the ATM network to the services required by the application. In cases where ATM is terminated at the end user equipment, the AAL entity is implemented there. There are a number of industry standards and proposed standards covering various AALs. In particular, "B-ISDN ATM Adaptation Layer Type 2 Specification," draft Recommendation I.363.2, November 1996, of ITU-T (herein referred to as AAL2) provides efficient transport of voice packets over ATM networks in such a way that allows very small transfer delay across the ATM network and still allows the receiver to recover the original packets.

Figure 3:
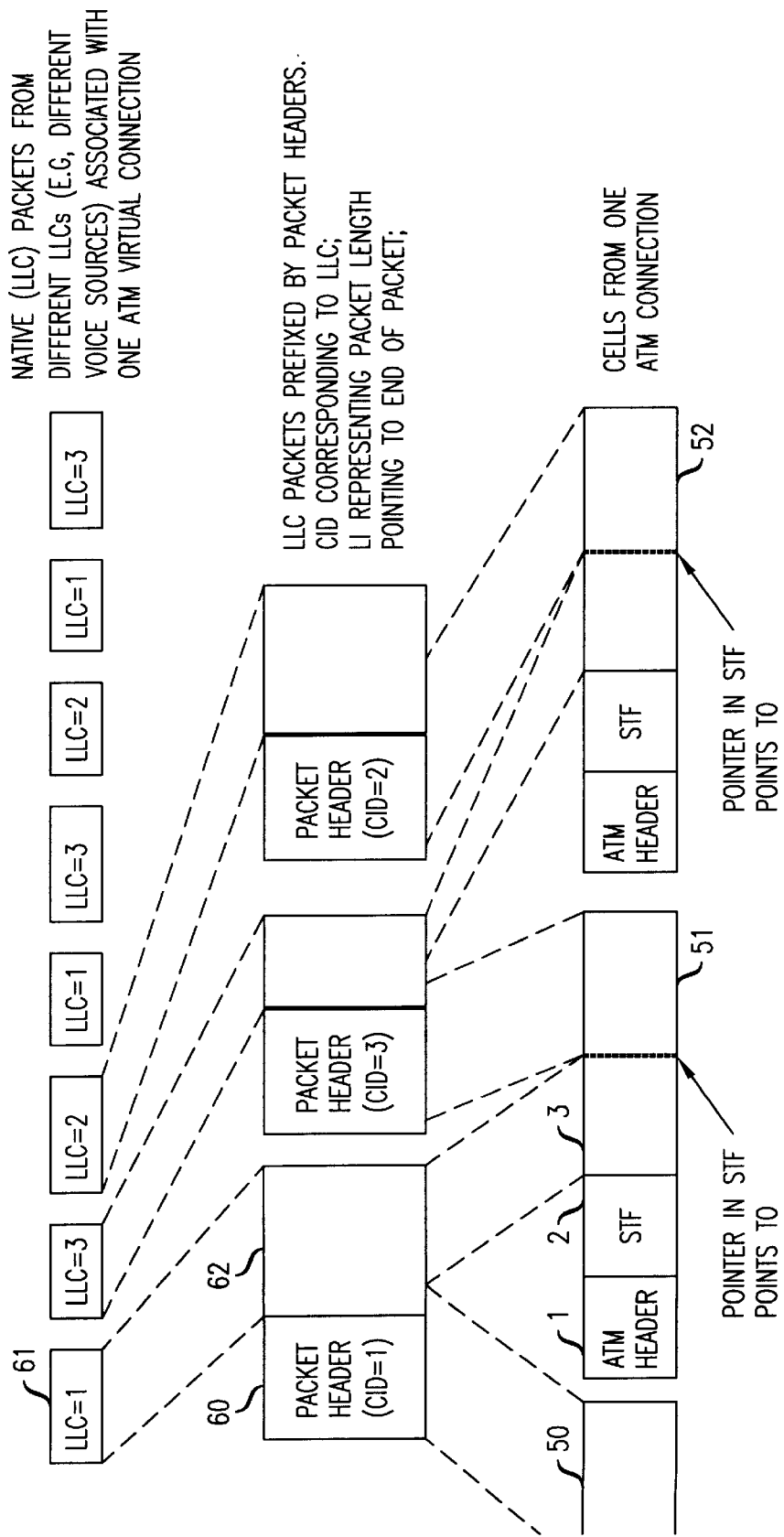
FIG. 3 shows an illustrative ATM cells and AAL2 formatting.

AAL2 treats the payloads from successive ATM cells from the same ATM connection as a byte stream in which variable length Logical Link Connections (LLC) packets are multiplexed. An illustration of ATM cells and AAL2 formatting is shown in FIG. 3. An ATM connection comprises a plurality of ATM cells, a portion of which is represented by the sequence of ATM cells 50, 51, and 52. Each ATM cell comprises an ATM header 1 (as known in the art), an STF field 2 and a plurality of LLC packets 3 (defined below). Each LLC packet, as represented by LLC packet 60 comprises a packet header 61 and a native LLC packet 62. (Packet header 61 is also known as an AAL2 Header.)

Figures 4, 5, 6:
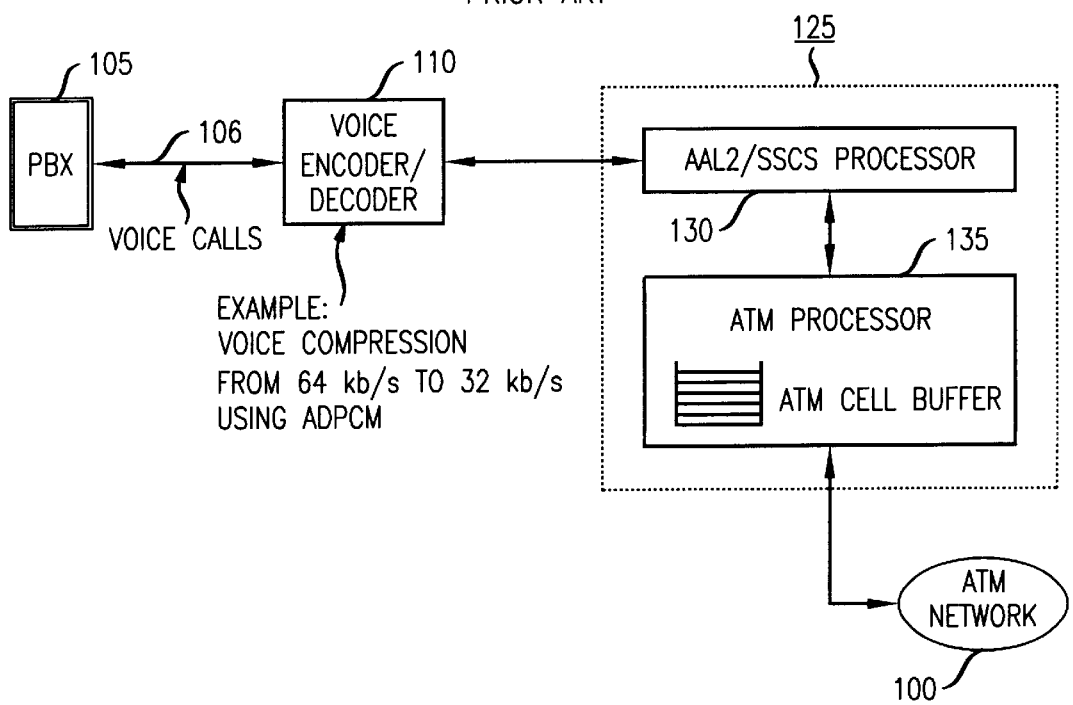
FIG. 4 shows a packet header of an LLC packet in accordance with AAL2.
FIG. 5 shows a start field of an ATM cell in accordance with AAL2.
FIG. 6 shows a portion of a prior art voice packet communications system.

The packet header is 3 octets long and is shown in detail in FIG. 4. The packet header comprises four fields: a Channel ID (CID) field, a Length Indicator (LI) field, a Reserved (RES) field, and a Header Error Check (HEC) field. (The RES field is also referred to as UUI (user-to-user indication) field in related standards documents.)

The CID field is 8 bits long and identifies the LLC to which the packet belongs. (Referring briefly back to FIG. 3, it is can be observed that the CID field value for the associated LLC packet corresponds to the LLC number.) The CID field provides support for a maximum of 255 native connections (LLCs) over a single ATM Virtual Circuit Connection (VCC) or VC. As known in the art, an ATM cell header allows two levels of addressing: a Virtual Path Identifier (VPI) and Virtual Connection Identifier (VCI). A Virtual Path Connection (VPC) can have a number of VCCs. With a 16 bit VCI field, an ATM VPC can support up to $255 \times 2^{16}$ Logical Link Connections.

The LI field is 6 bits and indicates the length of the LLC packet (or native packet). The LI field is added to each LLC packet so that the end of variable length packets can be demarcated. The LI field allows specification of up to 63 octets. When the value of the LI field points beyond the end of the current ATM cell, the packet is split between cells (this is also illustrated in FIG. 3, where LLC packet 60 is split between ATM cells 50 and 51). The HEC field is 5 bits (e.g., see FIG. 4) and provides error detection over the packet header.

AAL2 is partitioned into two sublayers, the Common Part Sublayer (CPS) and the Service Specific Convergence Sublayer (SSCS). The RES field comprises five bits, which are reserved or assigned to either the CPS or a Service Specific Convergence Function (SSCF) of the SSCS. The CPS provides the functions of multiplexing variable length packets from multiple sources into a single ATM virtual circuit and relaying these packets to form end-to-end AAL2 connections. That portion (not shown) of the RES field assigned to the CPS are used to provide signaling such as a "More" bit to indicate that the current packet is segmented, signaling, or user information. The remaining portion (not shown) of the RES field assigned to the SSCF provides an application specific function, a different instance of being provided to each AAL2 user. Examples of such functions are segmentation and reassembly of user flows into packets suitable for the common part, forward error control, identifying the voice coding algorithm, identifying the end of a speech burst, packet sequence number, etc. The SSCS can also be null. (At this point, the ITU-T standards body intends to specify SSCS protocols in future recommendations.) These SSCF-oriented bits are not interpreted by the AAL2 CPS and are passed transparently from the transmitting SSCS to the receiving SSCS. The SSCS may use these bits for specific SSCF functions or to pass higher layer user-to-user communication transparently. In the context of this description, it is assumed that the earlier-described sequence number is a part of the RES field (UUI field) for each packet. Of the 32 possible code point values, 28 UUI code points are available for sequence numbers and other purposes.

As can be observed from FIG. 3, a Start Field (STF) is present at the beginning of each ATM cell payload from a given ATM connection. The format of the STF field is shown in FIG. 5. An STF field is 1 octet in length and comprises an Offset field (OSF), a Sequence Number (SN) field and a Parity (P) field.

While the LI field in each LLC packet allows self delineation once a packet boundary is identified, a cell loss or an error in a packet header results in the loss of packet delineation. In order to regain packet boundaries, the OSF field specifies the beginning of the first new packet in the current ATM cell payload. The OSF field is 6 bits in length and indicates the remaining length of the packet that (possibly) started in the preceding cell from this ATM connection and is continuing in the current cell. Values of the OSF field range from 0 to 47. The OSF field is set to a zero value if the AAL2 packet begins right next to the STF and is set to a value of 47 if there is no AAL2 packet boundary. This approach guarantees resynchronization of packet boundaries in one ATM cell time after a delineation loss.

Given that a loss of an ATM cell, if not detected at the receiver, can misconcatenate packets, the SN field also exists (also known as a sequence indicator bit). The one bit SN field provides a modulo 2 sequence numbering of cells and immediate detection of a single cell loss. It may be noted that this 1-bit sequence number is different from the earlier-described sequence number which is part of the RES field in the AAL2 packet header.

Finally, like the packet header, the SN field and OSF field also require error detection. This is provided by the single parity bit of the P field, which provides odd parity.

AAL2 creates multiple levels of connections between two points: ATM virtual connections and AAL2 Logical Link Connections (LLCs). The AAL2 LLC in this case is defined to be a point-to-point connection, for example, between a base station and the vocoder group in the Mobile Switching Center (MSC) for cellular trunking, or between two PBX's or two switches for land-line trunking. The connection is defined to be bi-directional and the same CID is assumed to be used in both directions for a particular LLC. The set of CIDs available on an ATM VCC are known to both ends.

The negotiation procedures are symmetric, that is, either end of the AAL2 connection is permitted to initiate a new LLC or request tear down of an LLC. A simple negotiation procedure is defined where the originating end proposes establishment of a new LLC with the use of a particular CID that is not in use and the other end can accept or deny the request. Bandwidth management and monitoring for the ATM virtual circuit is assumed to be handled at the ATM connection management level. No such monitoring is proposed per LLC. However, it is the responsibility of the two end points to guarantee resource availability within the ATM connection to support a new LLC. Such resource management is assumed to be handled in a service specific manner. Signaling needed for LLC set up and tear down between AAL2 uses a predefined LLC (with CID=0).

AAL2 Voice Packet Communications

A portion of a prior art voice packet communications system is shown in FIG. 6. The elements shown in FIG. 6 are well-known and will not be described in detail. For example, although shown as a single block element, PBX 105 includes stored-program-control processors, memory, and appropriate interface cards. Private Branch Exchange (PBX) 105 transmits and receives a plurality of voice calls to voice encoder/decoder 110, via facility 106. The latter is representative of any number and type of communications facilities. To facilitate the description it is assumed that facility 106 is a DS1 facility (for each direction) as known in the art, which carries a plurality of calls. For each call, the audio information is a 64 kb/s (thousands of bits per second) bit stream in either direction. As new calls are placed from PBX 105 to voice encoder/decoder 110, these new calls are either accepted into the associated VC or blocked. (It is assumed that voice encoder/decoder 110 implements a call admission control strategy as known in the art, or as described in the co-pending, commonly assigned, U.S. Patent application of Sriram et al., Ser. No. 08/965515, filed on Nov. 6, 1997, and entitled "Method for Call Admission in Packet Voice System Using Statistical Multiplexing and Dynamic Voice Encoding.")

Once the call is admitted, voice encoder/decoder 110 compresses the 64 kb/s bit stream from PBX 105 into a 32 kb/s compressed audio stream using ADPCM as known in the art (e.g., ITU G.726) for application to voice processor 125. Similarly, in the other direction, voice encoder/decoder 110 decompresses the 32 kb/s compressed ADPCM bit stream provided by voice processor 125 into a 64 kb/s audio stream for application to PBX 105.

Voice processor 125 comprises AAL2/SSCS processor 130 and ATM processor 135. In transmitting information toward ATM network 100, AAL2/SSCS processor 130 converts the 32 kb/s compressed ADPCM bit stream into AAL2 packets for application to ATM processor 135. In this conversion, as described further below, the SSCS portion of processor 130 performs silence suppression, assignment of sequence numbers; and background noise level notification. In the opposite direction, AAL2/SSCS processor 130 receives AAL2 packets from ATM processor 135 and depacketizes them. AAL2/SSCS processor 130 provides: buffering (not shown) for build-out delay before playing out packets for transmission to voice encoder/decoder 110; and noise fill during silence period. In playing out the packets, AAL2/SSCS processor 130 makes use of sequence numbers to decide delayed packets and to maintain integrity in the play-out process (described below).

ATM processor 135 provides the following transmit functions: filling payload of ATM cells with AAL2 packets; forming an ATM cell whenever the payload is filled-up or a timer (e.g., 2 milli-seconds (ms)) expires with at least one AAL2 packet in the payload (whichever of the two events happens first); ATM cell header processing; placing ATM cells into a transmit buffer, etc. ATM processor 135 provides ATM cells to ATM network 100. ATM processor 135 receives ATM cells from ATM network 100 and provides the following receive functions: ATM cell header processing and error control; transferring AAL2 packets to AAL2/SSCS processing unit, etc.

A sequence of audio packets, starting from the end of a silence duration to the beginning of the next silence duration, is referred to herein as a "talk-spurt." A transmitter provides each packet with a sequence number (which is part of the RES field in the AAL2 packet header, described above). The range of sequence numbers is typically finite and repeats. For example, there may be eight sequence numbers, 0–7. At the start of the first talk-spurt, the first transmitted voice packet includes the sequence number 0. After the first eight packets are transmitted the sequence numbers begin to repeat, starting again at 0. During silent intervals, the transmitter still counts sequence numbers such that the packet at the start of the next talk-spurt receives a sequence number just as if the silence interval had, instead, contained voice packets.

Upon receiving the first packet of a call, the receiver waits for an initial period of time, referred to herein as the "build-out" delay, before reconstructing and playing out the audio signal during a connection, or call. Once the build-out delay has passed, the receiver reconstructs the audio signal using the recovered sequence numbers to re-order received packets for the duration of the connection. Unfortunately, the use of sequence numbers, by themselves, and a single build-out delay for the entire call does not mitigate other anomalies present in packet voice systems due to packet delay and packet loss.

Figure 7:
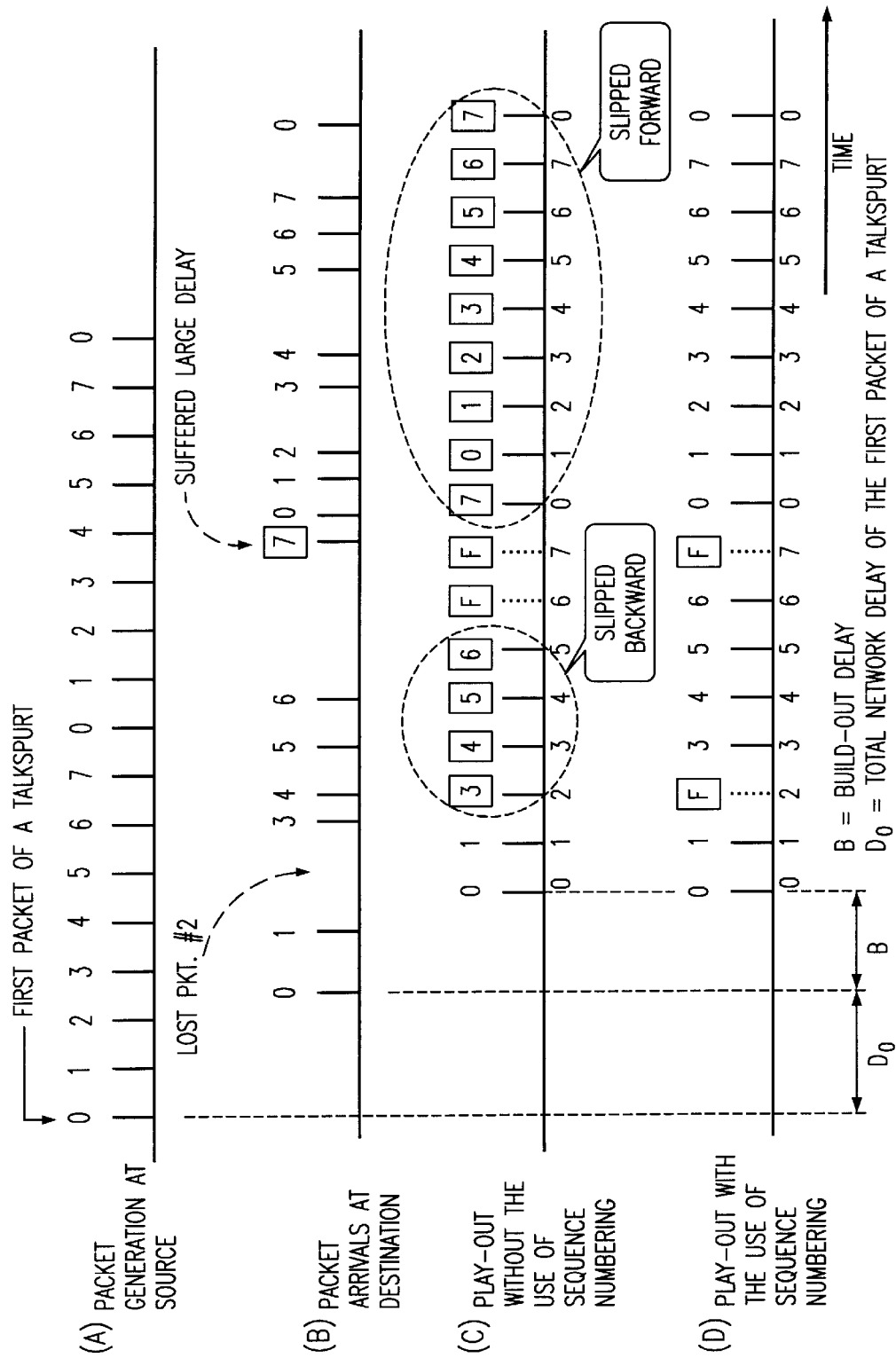
FIG. 7 shows a number of time-lines for illustrating sequence numbering and the use of a build-out delay during the duration of a call.

A set of time-lines are shown in FIG. 7 for illustrating the operation of AAL2/SSCS processor 130, sequence numbering, and the use of a build-out delay during the duration of a call.

Time-line (A) in FIG. 7 shows an illustrative talk-spurt comprising a number of packets. The latter is a stream of AAL2 packets, which do not convey silent intervals. In this example, AAL2/SSCS processor 130 creates an AAL2 packet, each AAL2 packet having an assigned sequence number, n, where $0 \leq n \leq 7$. As can be observed from FIG. 7, the sequence numbering repeats every n packets.

Time-line (B) shows the illustrative talk-spurt arriving at a receiving AAL2/SSCS processor (not shown). Each AAL2 packets arrives in the order it is received. As can be observed from time-line (B), there is a variable delay in the arrival time of each packet (as to be expected in packet transmission). The parameter $D_0$ is defined as the total network delay of the first packet of a talk-spurt. The parameter B is defined as the build-out delay. Also, it is assumed that the first packet with the sequence number of 2 (hereafter referred to a packet 2) has been lost and that the packet 7 has suffered a larger delay than the other packets.

For illustrative purposes, time-line (C) shows the effect on play-out of received packets if sequence numbering were not provided on the received packet stream shown in time-line (B). The receiving AAL2/SSCS processor begins play-out after the build-out delay, B. Packets are simply played out in the order received at periodic time intervals. Since packet 2 was lost and packet 3 was already received before the play-out time of packet 2, packet 3 is played-out in place of packet 2 at time interval 2. This results in the received packets being "slipped backward" as shown on time-line (C) of FIG. 7. At time intervals 6 and 7, there are no packets in the receive buffer (not shown). As such the receiving AAL2/SSCS processor inserts "FILL" (F) packets, e.g., low-level noise or extrapolated speech, into the play-out stream. Finally, packet 7 arrives in time to be played-out at the next time interval 0. This results in the remaining packets being "slipped forward" as shown on time-line (C) of FIG. 7.

In contrast, time-line (D) illustrates the advantage of using sequence numbering during play-out. Again, the receiving AAL2/SSCS processor begins play-out after the build-out delay, B. Packets are played out the receive buffer (not shown) in conjunction with the most recent sequence number at associated time intervals. Now, although packet 2 was lost and packet 3 was already received before the play-out time of packet 2, a fill packet (F) is played-out in place of packet 2 at time interval 2. As a result, the packets are not "slipped backward." At the associated time interval 3, packet 3 is played out. Packets continue to be played out in the correct sequence and time interval until packet 7. The latter has not yet been received for play-out at time interval 7 (as illustrated on time-line (B)). A fill packet (F) is played out instead. Finally, packet 7 arrives in time to be played-out at the next time interval 0. However, with sequence numbering, packet 7 is not played out at the next time interval 0. Instead, corresponding packet 0 is played out. As a result, the remaining packets are not "slipped forward." At this time, packet 7, which is already in the buffer, is recognized to have arrived late and hence is discarded. It may be noted that the present invention makes use of sequence numbers but is independent of the method of determining the value of n.

Selective Discard of Packets

Figure 8:
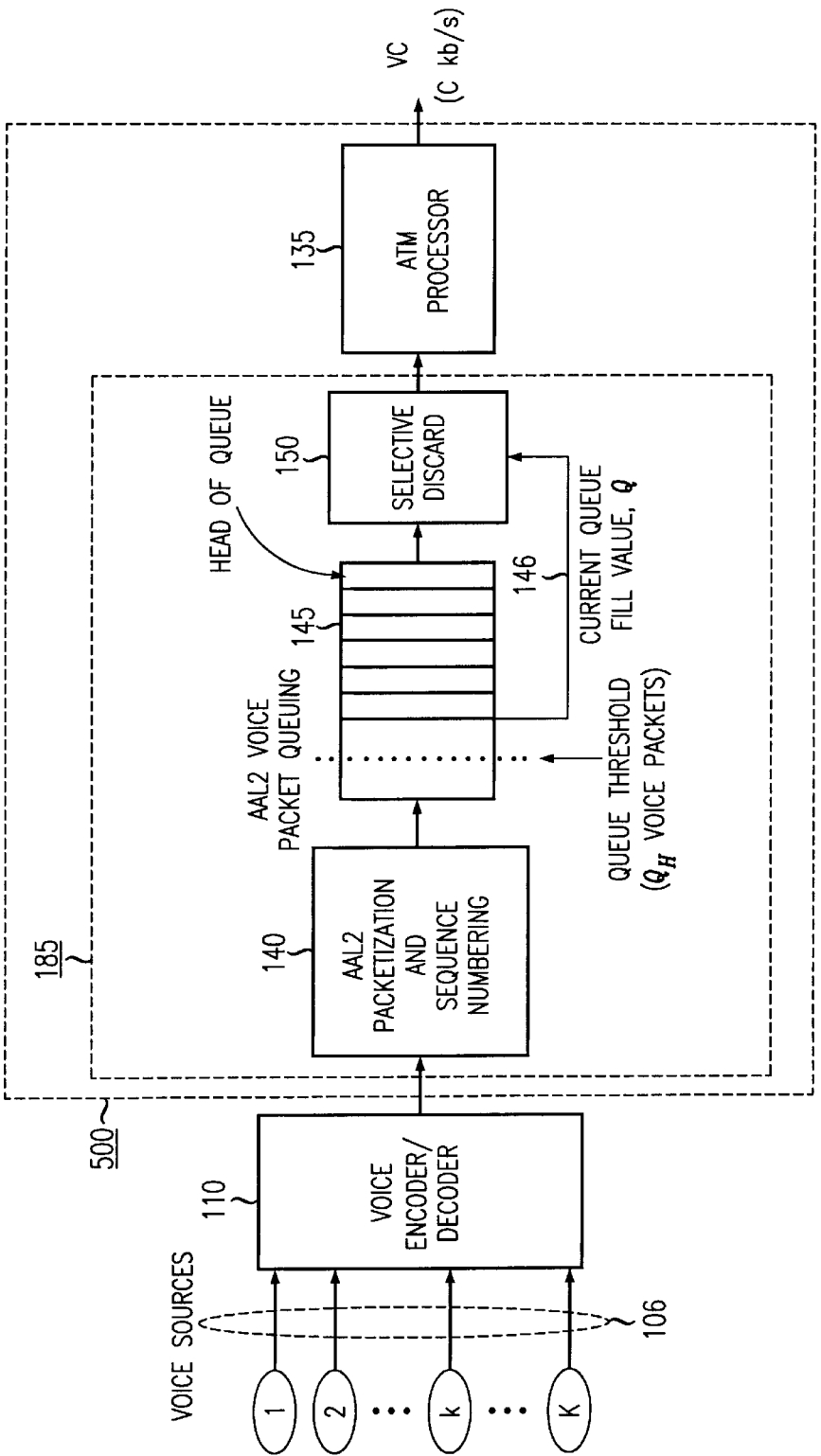
FIG. 8 shows an illustrative embodiment of a portion of a voice packet communications system in accordance with the principles of the invention.

An illustrative embodiment of the inventive concept is shown in FIG. 8. Other than the inventive concept, the elements shown in FIG. 8 are well-known and will not be described in detail. (It should also be noted that like numbers in different figures are similar elements.) Since the inventive concept is directed to transmission of voice packets, the operation of this system in receiving voice packets is assumed to be similar to that of the apparatus shown in FIG. 6.

In this representation, facility 106 is shown as conveying K voice-band calls to voice encoder/decoder 110, as described above. Voice processor 500 comprises AAL2/SSCS processor 185 and ATM processor 135. AAL2/SSCS processor 185 comprises AAL2 packetization and sequence numbering element 140, AAL2 queue 145, and selective discard element 150 (described below). As can be observed, this AAL2/SSCS packet system multiplexes a variety of traffic types onto an outgoing ATM VC pipe, or facility, which has a fixed bandwidth C kb/s. This fixed bandwidth is determined a priori or negotiated with a distant ATM endpoint, as known in the art.

As noted earlier, in transmitting information toward ATM network 100, voice encoder/decoder 110 provides a 32 kb/s compressed ADPCM bit stream. This bit stream is applied to AAL2 packetization and sequence numbering element 140, which converts the 32 kb/s compressed ADPCM bit stream into AAL2 packets for application to AAL2 voice packet queue 145. In performing this conversion, AAL2 packetization and sequence numbering element 140 performs silence suppression, assignment of sequence numbers; and background noise level notification as known in the art. A 5 ms packet interval is assumed. AAL2 voice packet queue 145 buffers AAL2 voice packets for transmission. For example, the AAL2 packet at the head of this queue has a sequence number and belongs to a voice source k associated with a CID value, described above. Although not required, for this description the value of k is assumed to be equal to the associated CID value.

In response to signaling (not shown) from ATM processor 135, selective discard element 150 empties AAL2 voice packet queue 145 and provides AAL2 voice packets for transmission to ATM processor 135, which functions as described earlier. The rate at which ATM processor 135 transmits AAL2 voice packets directly effects the number of AAL2 voice packets awaiting transmission in AAL2 voice packet queue 145. As such, during periods of network congestion, the number of AAL2 voice packets awaiting transmission in this queue increases. The number of AAL2 voice packets in AAL2 voice packet queue 145 at any time is referred to herein as the current queue fill value, Q. The current queue fill value is provided to selective discard element 150 via signal 146. When the current queue fill value exceeds a predefined queue threshold value, $Q_H$, selective discard element 150 selectively discards entire AAL2 voice packets in accordance with the principles of the invention, by selectively discarding one packet from a group of N successive packets belonging to one voice source. In particular, selective discard element 150 removes AAL2 voice packets from the head of AAL2 voice packet queue 145 in accordance with a "modulo-N selective discard" method (described below).

The selective discard of AAL2 voice packets in accordance with the inventive concept spreads packet loss over multiple users during a traffic congestion, or overload condition. As a result, the inventive concept provides the ability to get more use out of sequence numbers by, e.g., preventing the above-described forward/backward slips by keeping lost packets to approximately one in every N packets for each source during congestion periods. In this approach, it is less likely that the same source will suffer consecutive packet discard. In accordance with the terminology used above with respect to packet transmission, the value for N corresponds to the total number of possible sequence numbers n. For example, if $0 \leq n \leq 7$, (i.e., the value for n is modulo-8) then N=8.

Figure 9:
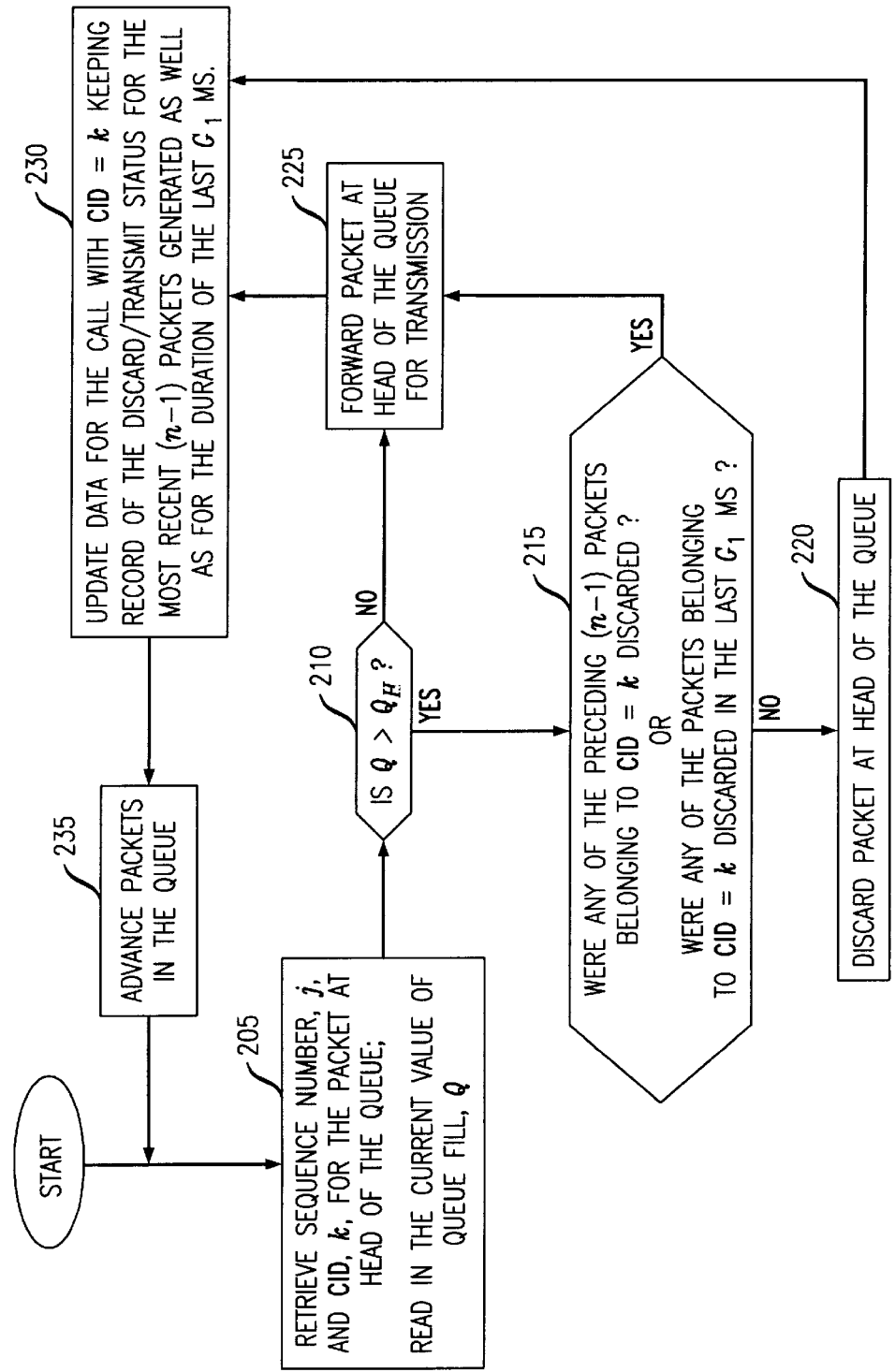
FIG. 9 shows an illustrative method in accordance with the principles of the invention for use in the transmitter portion of FIG. 8.

Reference should now be made to FIG. 9 which illustrates a selective discard method in accordance with the principles of the invention for use in AAL2/SSCS processor 185. (It is presumed that AAL2/SSCS processor 185 is suitably programmed to carry out the below-described method using conventional programming techniques, which, as such, will not be described herein.)

The illustrative method of FIG. 9 performs modulo-n selective packet discard at the output of a queue. In step 205, selective discard element 150 examines the AAL2 voice packet at the head of AAL2 voice packet queue 145, retrieving the sequence number j and the CID value, k. In addition, selective discard element 150 reads in the current queue fill value, Q, via signal 146. In step 210, selective discard element 150 determines if the value of Q is greater than $Q_H$. If the number of AAL2 voice packets in AAL2 voice packet queue 145 is less than or equal to the value of $Q_H$, selective discard element 150 forwards the AAL2 voice packet at the head of the queue to ATM processor 135 for transmission. On the other hand, if the number of AAL2 voice packets in AAL2 voice packet queue 145 is greater that the value of $Q_H$, selective discard element 150 proceeds to step 215. In this latter step, selective discard element 150 performs two operations. First, selective discard element 150 looks back to determine if any of the previous n−1 packets from voice source k were discarded. Second, selective discard element 150 looks back over the last $G_1$ ms to determine if any packets from voice source k were discarded over this time interval. (In this example, illustrative value are: $Q_H$=90% of the buffer capacity in terms of AAL2 packets, n=8 and $G_1$=100 ms.). These requirements of step 215 avoid dropping more than 1 packet in a modulo N sequence (again, here N=n), or within a predefined period of time, $G_1$, from the same voice source.

In effect, selective discard element 150 keeps track of two sliding windows of voice packet transmissions for each voice source, k. One window looks back over the previous n−1 packet transmissions for each source, while the other window looks back over the packet transmissions in the previous $G_1$ ms. One illustrative way to perform this "windowing" is for selective discard element 150 to maintain two tables for each source, k, as illustrated in FIG. 10.

Table 285 comprises n−1 rows for voice source, k. As noted above, the sequence numbers repeat, i.e., they are "modulo-n." As such, table 285 is illustratively implemented as a push-down stack, i.e., when a "new entry" is "pushed on", the "last entry" is lost. Table 285 tracks the status of the preceding n−1 packets. The entries here denote "dropped" and "carried." (These can be represented by any predefined values, e.g., a logical "1" and logical "0," respectively.) At startup, the corresponding entries are initially set to "carried." If a packet is discarded from this source in the current cycle, the corresponding entry is set to "dropped."

Similarly, Table 290 is illustratively implemented as a push-down stack, i.e., when a "new entry" is "pushed on", the "last entry" is lost. It should be noted that the length of the stack for table 290 is equal to G/T, where G=time interval and T is the packetization interval (here, G=$G_1$ and T is assumed to be equal to 5 ms). In other words, table 290 tracks packet status for a particular source over the preceding G/T ms. The entries here are similarly denoted as "dropped" and "carried." At startup, the corresponding entries are initially set to "carried." If a packet is discarded from this source the corresponding entry is set to "dropped."

In step 215, selective discard element 150 scans each entry in table 285 and table 290 for the particular source, k. If none of these entries correspond to "dropped," then processing proceeds to step 220. In the latter step, the AAL2 voice packet at the head of AAL2 voice packet queue 145 is discarded However, if, in step 215, one of these table entries corresponds to "dropped" for this source, then processing proceeds to step 225, where the AAL2 voice packet at the head of AAL2 voice packet queue 145 is forwarded to ATM processor 135 for transmission, notwithstanding the need to drop an AAL2 voice packet.

In step 230, selective discard element 150 updates tables 285 and 290 to reflect whether a packet for this voice source was "carried" or "dropped." Finally, in step 235, selective discard element 150 advances the AAL2 voice packets in AAL2 voice packet queue 145. (Although a "queue control" signal is not shown in FIG. 8, methods of implementing storage elements, or tables, e.g., as rotating stack or as a first-in-first-out (FIFO) storage element are known in the art, and are not described herein).

Another embodiment of the inventive concept is shown in FIG. 11. Here, voice processor 600 comprises AAL2/SSCS processor 190 and ATM processor 135. Although similar in operation to the embodiment shown in FIG. 8, this example selectively discards AAL2 voice packets at the input to an AAL2 voice packet queue. As such, AAL2/SSCS processor 190 comprises AAL2 packetization and sequence numbering element 140, which provides AAL2 voice packets to selective discard element 160. The latter either provides AAL2 voice packets to AAL2 voice packet queue 165 or, under certain conditions, discards AAL2 voice packets (described below). The number of AAL2 voice packets in AAL2 voice packet queue 165 at any time is referred to herein as the current queue fill value, Q. The current queue fill value is provided to selective discard element 160 via signal 166. When the current queue fill value exceeds a predefined queue threshold value, $Q_H$, selective discard element 160 selectively discards entire AAL2 voice packets in accordance with the principles of the invention, by selectively discarding a voice packet. In particular, selective discard element 160 drops an AAL2 voice packet received from AAL2 packetization and sequence numbering element 140 (described below). The latter provides AAL2 voice packets comprising a sequence number, j, and a CID value, which, again, is assumed to be equal to k in this example.

Figure 12:
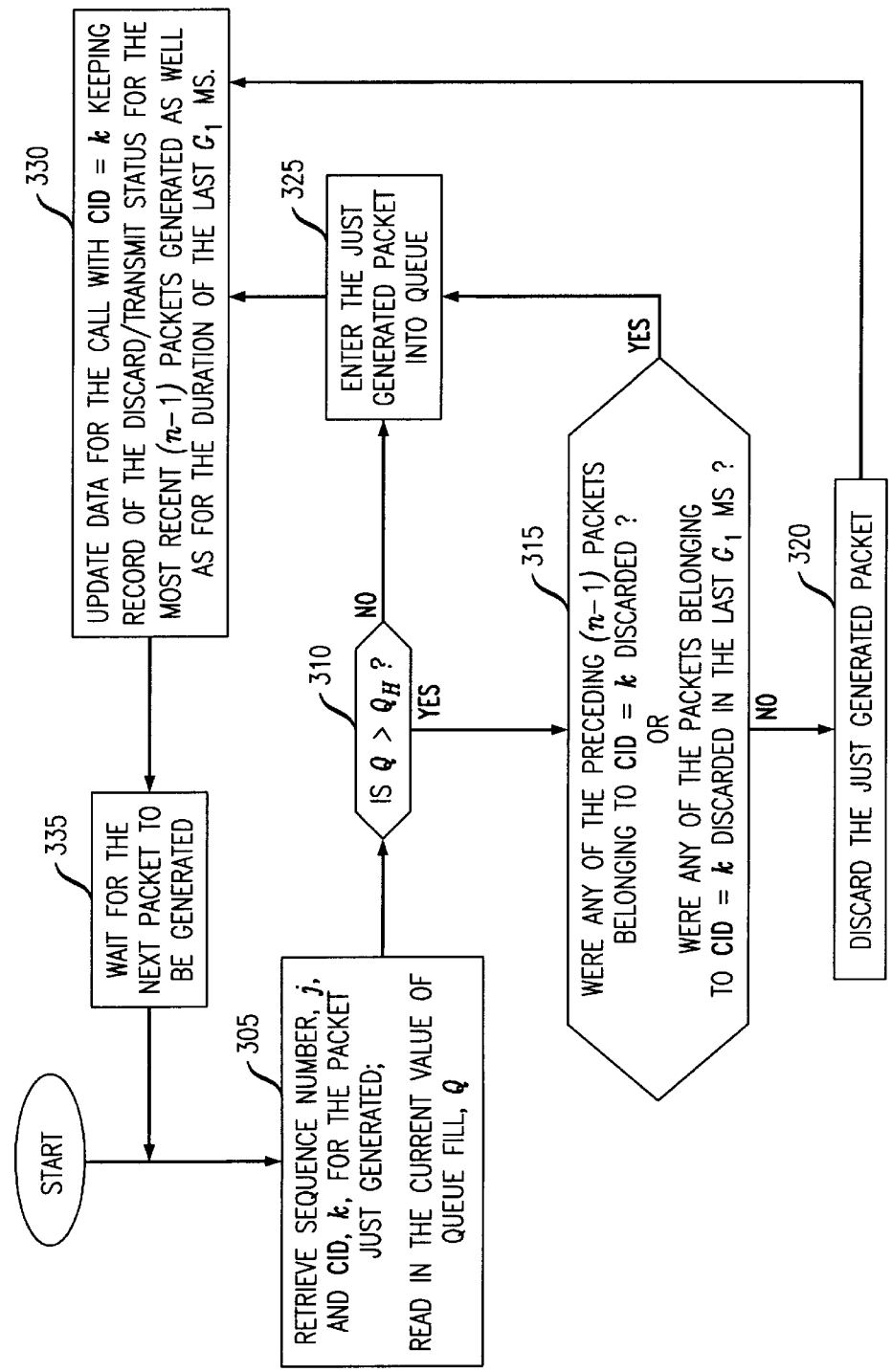
FIG. 12 shows another illustrative method in accordance with the principles of the invention for use in the transmitter portion of FIG. 11.

Reference should now be made to FIG. 12 which illustrates a selective discard method in accordance with the principles of the invention for use in AAL2/SSCS processor 190. This method performs modulo-n selective packet discard at the input of a queue. In step 305, selective discard element 160 examines the AAL2 voice packet just generated by AAL2 packetization and sequence numbering element 140. In particular, selective discard element 160 retrieves the sequence number and the CID value, k. In addition, selective discard element 160 reads in the current queue fill value, Q, via signal 166.

In step 310, selective discard element 160 determines if the value of Q is greater than $Q_H$. If the number of AAL2 voice packets in AAL2 voice packet queue 165 is less than or equal to the value of $Q_H$, selective discard element 160 enters the AAL2 voice packet just generated into AAL2 voice packet queue 165 in step 325. On the other hand, if the number of AAL2 voice packets in AAL2 voice packet queue 165 is greater that the value of $Q_H$, selective discard element 160 proceeds to step 315. In this latter step, selective discard element 160 performs two operations. First, selective discard element 160 looks back (n−1) packets to determine if any packets from voice source k were discarded from these preceding packets. Second, selective discard element 160 looks back over the last $G_1$ ms to determine if any packets from voice source k were discarded over this time interval. (In this example, illustrative value are: $Q_H$=90% of the buffer capacity in terms of AAL2 packets, n=8 and $G_1$=100 ms.). These requirements of step 315 avoid dropping more than 1 packet in a modulo N sequence (again, here N=n), or within a predefined period of time, $G_1$, from the same voice source.

Like the description of the method shown in FIG. 9, selective discard element 160 keeps track of two sliding windows of voice packet transmissions, also represented by tables 285 and 290 of FIG. 10. One window (table 285) looks back over the previous n−1 packet transmissions, while the other window (table 290) looks back over the packet transmissions in the previous G ms (here G=$G_1$). In step 315, selective discard element 160 scans each entry in table 285 and table 290. If none of these entries indicate "dropped" for this packet source, k, then processing proceeds to step 320. In the latter step, the AAL2 voice packet just generated by AAL2 packetization and sequence numbering element 140 is discarded by selective discard element 160. However, if, in step 315, one of entries indicates a packet was previously dropped from this voice source, k, then processing proceeds to step 325, where selective discard element 160 enters the AAL2 voice packet just generated into AAL2 voice packet queue 165.

In step 330, selective discard element 160 updates tables 285 and 290 of FIG. 10. Finally, in step 335, selective discard element 160 waits for the next packet to be generated by AAL2 packetization and sequence numbering element 140. (In this method, it is assumed that AAL2 voice packet queue 165 is directly emptied by ATM processor 135. (Indeed, this queue can also be located with ATM processor 135.) Although a "queue control" signal is not shown in FIG. 11, methods of implementing storage elements, or tables, e.g., as rotating stack or as a first-in-first-out (FIFO) storage element are known in the art, and are not described herein).

Another alternative method is shown in FIG. 13 for use in AAL2/SSCS processor 190 of FIG. 11. This method performs modulo-n selective packet discard at the input of a queue and also provides the ability to drop a packet from within the queue when it is not desirable to discard the packet at the input of the queue. In step 405, selective discard element 160 examines the AAL2 voice packet just generated by AAL2 packetization and sequence numbering element 140. In particular, selective discard element 160 retrieves the sequence number j and the CID value, k. In addition, selective discard element 160 reads in the current queue fill value, Q, via signal 166, and sets a variable, i, to be equal to a value L, where L is the capacity of AAL2 voice packet queue 165. In step 410, selective discard element 160 determines if AAL2 voice packet queue 165 is full, i.e., if the value of Q is equal to L. If the number of AAL2 voice packets in AAL2 voice packet queue 165 is less than the value of L, selective discard element 160 enters the AAL2 voice packet just generated into AAL2 voice packet queue 165 in step 455. On the other hand, if AAL2 voice packet queue 165 is full, processing proceeds to step 415. In this latter step, selective discard element 160 performs two operations. First, selective discard element 160 looks back (n−1) packets to determine if any packets from voice source k were discarded from these preceding packets. Second, selective discard element 160 looks back over the last $G_2$ ms to determine if any packets from voice source k were discarded over this time interval. (In this example, illustrative value are: n=8, L=100 AAL2 packets, and $G_2$=100 ms.). These requirements of step 415 avoid dropping more than 1 packet in a modulo N sequence (again, here N=n), or within a predefined period of time, $G_2$, from the same voice source.

Like the description of the methods shown in FIGS. 9 and 12, selective discard element 160 keeps track of two sliding windows of voice packet transmissions, also represented by tables 285 and 290 of FIG. 12. One window (table 285) looks back over the previous n−1 packet transmissions, while the other window (table 290) looks back over the packet transmissions in the previous G ms (here G=$G_2$). In step 415, selective discard element 160 scans each entry in table 285 and table 290 for voice source, k. If none of these entries indicate a previously "dropped" packet, then processing proceeds to step 430. In the latter step, the AAL2 voice packet just generated by AAL2 packetization and sequence numbering element 140 is discarded by selective discard element 160. However, if, in step 415, one of these entries does indicate a previously "dropped" packet from this voice source, k, then processing proceeds to step 420, where selective discard element 160 retrieves the value of the sequence number, 1, and the value of the CID, m, for the AAL2 voice packet at position i in AAL2 voice packet queue 165. (Since i is initialized to L, in step 405, selective discard element 160 begins looking at the last AAL2 voice packet in AAL2 voice packet queue 165. As the value of i is decremented (described below), selective discard element 160 moves through AAL2 voice packet queue 165, if necessary, examining the respective sequence number and CID values of each stored AAL2 voice packet.)

After step 420, processing proceeds to step 425 where selective discard element 160 performs two operations. First, selective discard element 160 looks in the corresponding table (illustrated in FIG. 10) for voice source, m, to determine if any packets were discarded over the previous (n−1) packets for voice source, m. Second, selective discard element 160 looks back over the last $G_2$ ms to determine if any packets from voice source m were discarded over this time interval. Like the requirements of step 415, the requirements of step 425 avoid dropping more than 1 packet in a modulo N sequence (again, here N=n), or within a predefined period of time, $G_2$, from the same voice source. In step 425, selective discard element 160 scans each entry in table 285 and table 290. If none of these entries indicate a previously "dropped" packet from voice source, m, then processing proceeds to step 445. In the latter step, selective discard element 160 discards the AAL2 voice packet at position i in AAL2 voice packet queue 165. If i<L, selective discard element 160 moves forward the AAL2 voice packets in positions L through (i+1). Also, in step 445, selective discard element 160 enters the AAL2 voice packet just generated into AAL2 voice packet queue 165.

However, if in step 425, one of these entries does indicate a previously "dropped" packet from this voice source, m, then processing proceeds to step 440, where selective discard element 160 checks if i=0. If the value of i is equal to zero, selective discard element 160 performs step 430, described above, which discards the AAL2 voice packet just generated by AAL2 voice packetization and sequence numbering element 140 even though an AAL2 voice packet had been previously discarded from this source either within the last (n−1) AAL2 packets or within $G_2$ ms. If the value of i is not equal to zero, selective discard element 160 decrements the value of i in step 435 and returns to step 420, to repeat the process of searching for an AAL2 voice packet to discard.

After steps 455, 430, and 445, processing proceeds to step 450, where selective discard element 160 updates tables 285 and 290, of FIG. 10. Finally, in step 460, selective discard element 160 waits for the next packet to be generated by AAL2 packetization and sequence numbering element 140. (In this method, it is assumed that AAL2 voice packet queue 165 is directly emptied by ATM processor 135 and that entries can be altered by selective discard element 160. Although a "queue control" signal is not shown in FIG. 11, methods of implementing storage elements, or tables, e.g., as rotating stack or as a first-in-first-out (FIFO) storage element are known in the art, and are not described herein).

The algorithm of FIG. 13 may also be implemented by checking at step 410 if the packet queue fill has exceeded a predefined threshold, $Q_H$ (instead of checking if the packet queue is full).

It should be noted that in the method shown in FIG. 13, AAL2 voice packet queue 165 can be implemented in such a fashion so as to speed up the processing. For example, a "tag" value could be associated with each queue position, where the tag value is indicative of whether or not the corresponding AAL2 voice packet is available for discarding. As illustration, a tag value of "0," represents the associated AAL2 voice packet cannot be dropped, whereas a tag value of "1," represents the associated AAL2 voice packet is available for being discarded, if necessary. Each tag value can be set at the time the AAL2 voice packet is placed in the queue. Determination of a tag value is done using the concept of FIG. 13 for ascertaining if an AAL2 packet can be dropped or not.

The algorithms in FIGS. 9, 12, and 13 can be generalized so that multiple thresholds for selective packet discard can be applied to a queue. Accordingly, at different levels of congestion in the queue, different levels of packet discard tolerance may be allowed. For example, let the multiple thresholds on a particular queue be denoted as $Q_0$, $Q_1$, $Q_2$, $Q_3$, . . . , $Q_{n-1}$. Now the selective discard policy may be generally based on the rule that if the current queue fill value, Q, lies in the range $Q_i<Q<Q_{i+1}$, then a packet (at input, output, or within the particular queue) may be discarded if the source of that packet has lost no more than i packets over the preceding (n−1) packets generated by that source or over the last $G_1$ ms duration. The modifications to the flow charts in FIGS. 9, 12, and 13 based on the above stated generalization of the selective packet discard policy are straightforward and, as such, are not described herein. For example, step 210 of FIG. 9 would be modified to incorporate testing for identifying a range $Q_i \leq Q \leq Q_{i+}$, and would perform subsequent processing as a function of that result.

The invention described here is generally applicable for use at an edge node of a network or at an internal node. (A node may be a packet switch or a router.) When the method of this invention is used at an internal node in a network, the lost packets generally include any that were lost at a previous node(s). The knowledge of lost packets is maintained at each node based on the sequence number information provided in the packets (e.g., the sequence numbers in the UUI field of an AAL2 packet).

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., a selective discard element, the functions of any one or more of those building blocks can be carried out using one or more appropriately programmed processors, e.g., a digital signal processor.

Also, although the inventive concept was illustrated in the context of ATM, other examples of transport networks over which packets of voice are transmitted are wire-line and wire-less networks, the Internet, and corporate Intranets. In the case of the Internet or Intranets, packets are transported using an Internet Protocol (IP) format.

What is claimed:

1. A method for discarding packets, the method comprising the steps of:

storing a number of packets for transmission in a buffer;

detecting when the number of stored packets reaches a predefined level; and responsive to the detecting step, retrieving a channel identifier from a packet;
checking if prior packets associated with the channel identifier were discarded over a previous time interval;
if at least one of the prior packets was previously discarded, forwarding the packet for transmission; and
discarding the packet otherwise.

2. The method of claim 1 wherein the discarded packet is dropped from the buffer.

3. The method of claim 1 wherein the discarded packet is dropped from an output end of the buffer.

4. The method of claim 1 wherein the discarded packet is dropped before storage in the buffer.

5. The method of claim 1 wherein the checking step checks if any of n−1 prior packets associated with the channel identifier were discarded.

6. The method of claim 1 wherein the retrieving step also retrieves a sequence number value of the packet, where the sequence number value is less than or equal to n.

7. A method for discarding packets, the method comprising the steps of:
(a) retrieving a channel identifier from a packet stored in a buffer;
(b) retrieving a fill value of the buffer;
(c) if the fill value of the buffer is less than a predefined level, forwarding the packet for transmission;
(d) if the fill value is not less than a predefined level, checking if prior packets associated with the channel identifier were previously discarded;
if at least one of the prior packets was previously discarded, forwarding the packet for transmission; and
discarding the packet otherwise.

8. The method of claim 7 further comprising the step of updating a record of the prior discarded packets subsequent to step (d).

9. The method of claim 8 further comprising the step of advancing packets in the buffer.

10. The method of claim 7 wherein the checking step checks if any of n−1 prior packets were discarded.

11. The method of claim 10 wherein step (a) also retrieves a sequence number value of the packet, where the sequence number value is less than or equal to n.

12. The method of claim 7 wherein the checking step checks if any prior packets were discarded over a previous time interval.

13. The method of claim 7 wherein the checking step checks if any of n−1 prior packets were discarded or if any prior packets were discarded over a previous time interval.

14. A method for discarding packets, the method comprising the steps of:
(a) retrieving a channel identifier from a packet;
(b) retrieving a fill value of a buffer;
(c) if the fill value of the buffer is less than a predefined level, storing the packet in the buffer;
(d) if the fill value is not less than a predefined level, checking if prior packets associated with the channel identifier were previously discarded; and
if at least one of the prior packets was previously discarded, storing the packet in the buffer;
discarding the packet otherwise.

15. The method of claim 14 further comprising the step of updating a record of the prior discarded packets subsequent to step (d).

16. The method of claim 14 wherein the checking step checks if any of n−1 prior packets were discarded.

17. The method of claim 16 wherein step (a) also retrieves a sequence number value of the packet, where the sequence number value is less than or equal to n.

18. The method of claim 14 wherein the checking step checks if any prior packets were discarded over a previous time interval.

19. The method of claim 14 wherein the checking step checks if any of n−1 prior packets were discarded or if any prior packets were discarded over a previous time interval.

20. A method for discarding packets, the method comprising the steps of:
(a) retrieving a channel identifier from a packet;
(b) retrieving a fill value of a buffer;
(c) if the fill value of the buffer is less than a predefined level, storing the packet in the buffer;
(d) if the fill value is not less than a predefined level, checking if prior packets associated with the channel identifier were previously discarded;
(i) if at least one of the prior packets was previously discarded, checking the buffer for any stored packets that have not had a prior packet discarded;
(ii) if a stored packet is found that has not had a prior packet discarded,
discarding this stored packet;
adding the packet to the buffer; and
(iii) if a stored packet is not found that has not had a prior packet discarded;
discarding the packet.

21. The method of claim 20 further comprising the step of updating a record of the prior discarded packets subsequent to step (d).

22. The method of claim 20 wherein the checking steps (d) and (i) check if any of n−1 prior packets were discarded.

23. The method of claim 22 wherein steps (a) and (i) also retrieve a sequence number value of the packet, where the sequence number value is less than or equal to n.

24. The method of claim 20 wherein the checking steps (d) and (i) check if any prior packets were discarded over a previous time interval.

25. The method of claim 20 wherein the checking steps (d) and (i) check if any of n−1 prior packets were discarded or if any prior packets were discarded over a previous time interval.

26. The method of claim 20 wherein the predefined level is set to a capacity of the buffer.

27. Apparatus for discarding packets, the apparatus comprising:
a buffer for storing a number of packets for transmission; and
a processor for detecting when the number of stored packets reaches a predefined level, and, responsive to the detection, (a) retrieving a channel identifier from a packet, (b) checking if prior packets associated with the channel identifier were previously discarded, and (c) if at least one of the prior packets was previously discarded, forwarding the packet for transmission, and discarding the packet otherwise.

28. The apparatus claim 27 wherein the discarded packet is dropped from the buffer.

29. The apparatus of claim 27 wherein the discarded packet is dropped from an output end of the buffer.

30. The apparatus of claim 27 wherein the discarded packet is dropped before storage in the buffer.

31. The apparatus of claim 27 wherein the processor checks if any of n−1 prior packets associated with the channel identifier were discarded.

32. The apparatus of claim 27 wherein the processor also retrieves a sequence number value of the packet, where the sequence number value is less than or equal to n.

33. The apparatus of claim 27 wherein the processor checks if any prior packets associated with the channel identifier were discarded over a previous time interval.

34. Apparatus for discarding packets, the apparatus comprising:
- a first processing element for forming packets, each packet having a channel identifier;
- a buffer for storing the formed packets; and
- a second processor for (a) detecting when the number of stored packets reaches a predefined level as a precondition to discarding ones of the formed packets, (b) retrieving a channel identifier from ones of the formed packets, (c) checking if prior packets associated with the channel identifier were previously discarded, and (d) if at least one of the prior packets was previously discarded, forwarding the packet for transmission, and discarding the packet otherwise.

35. The apparatus claim 34 wherein the second processor discards ones of the formed packets from the buffer.

36. The apparatus of claim 34 wherein second processor discards ones of the formed packets from an output end of the buffer.

37. The apparatus of claim 34 wherein the second processor discards ones of the formed packets before storage in the buffer.

38. The apparatus of claim 34 wherein the second processor checks if any of n−1 prior packets associated with the channel identifier were discarded.

39. The apparatus of claim 34 wherein the second processor also retrieves a sequence number value of the packet, where the sequence number value is less than or equal to n.

40. The apparatus of claim 34 wherein the processor checks if any prior packet associated with the channel identifier were discarded over a previous time interval.

41. The apparatus of claim 34 wherein the packet is an ATM Adaptation Layer packet.

42. The apparatus of claim 34 wherein the packet is an ATM Adaptation Layer 2 packet.

43. The apparatus of claim 34 wherein the packet is an Internet Protocol (IP) packet.

* * * * *